3 Sheets—Sheet 1.

A. F. KIBBE.
Oil-Stove.

No. 199,981. Patented Feb. 5, 1878.

Witnesses:
James H. Hunter
Charles N. Nash

Inventor
Augustus F. Kibbe

N. PETERS, PHOTO-LITHOGRAPHER, WASHINGTON, D. C.

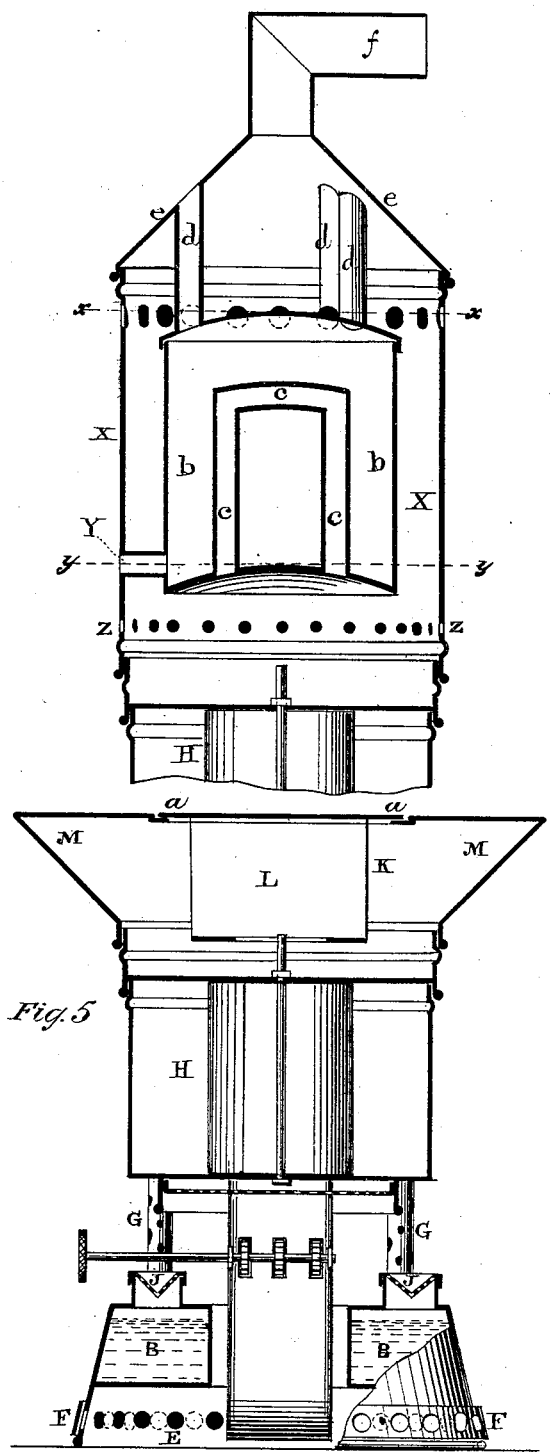
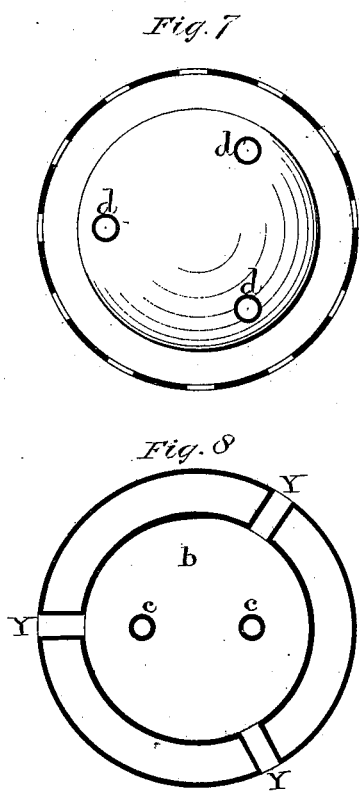
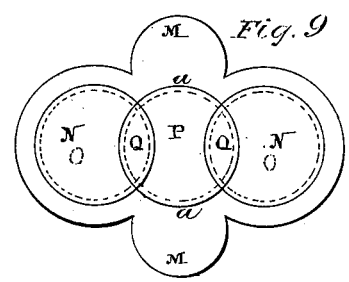
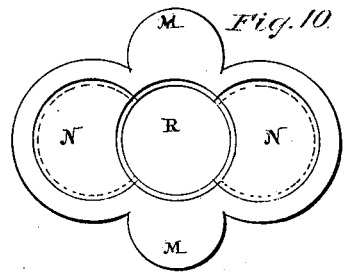

3 Sheets—Sheet 3.

A. F. KIBBE.
Oil-Stove.

No. 199,981. Patented Feb. 5, 1878.

Witnesses:
James H. Hunter
Charles H. Nash

Inventor
Augustus F. Kibbe

UNITED STATES PATENT OFFICE.

AUGUSTUS F. KIBBE, OF BROOKLYN, NEW YORK.

IMPROVEMENT IN OIL-STOVES.

Specification forming part of Letters Patent No. 199,981, dated February 5, 1878; application filed October 4, 1877.

*To all whom it may concern:*

Be it known that I, AUGUSTUS F. KIBBE, of the city of Brooklyn, in the county of Kings and State of New York, have invented a new and useful Improvement in Oil-Stoves, which improvement is fully set forth in the following description, reference being had to the accompanying drawings, forming part of this specification.

The object of my invention is to construct an oil-stove in such manner that it may be used either as a heater or for cooking purposes, and which shall be at all times perfectly safe in its use, there being provision made for a free circulation of air under and through the center of the oil-reservoir on both sides of the wick-tubes for the purpose of keeping both the reservoir and wick-tubes cool.

The standards on the oil-reservoir for the support of the stove are made hollow and perforated, so as to prevent heat from being transmitted to the oil-reservoir; and, furthermore, the drum which fits on top of the stove acts in a similar capacity to that of a chimney of a lamp, and produces the most perfect combustion possible, as well as adding size to the stove, so that it presents a better appearance, and looks more like a stove than those now in use.

The construction and operation of my invention will be fully understood from the following description, reference being had to the drawings, in which—

Figure 4:
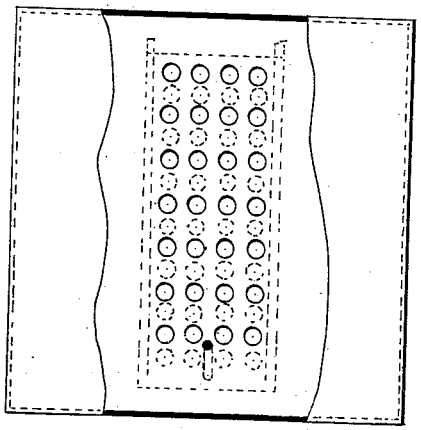
Figure 1:
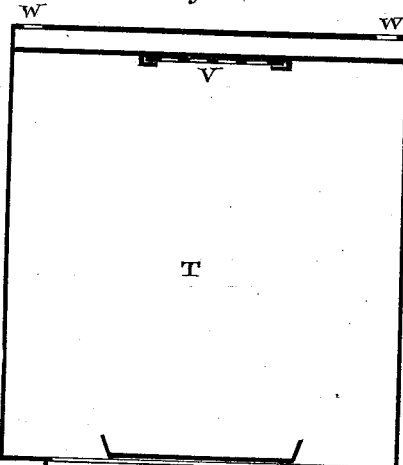
Figure 2:
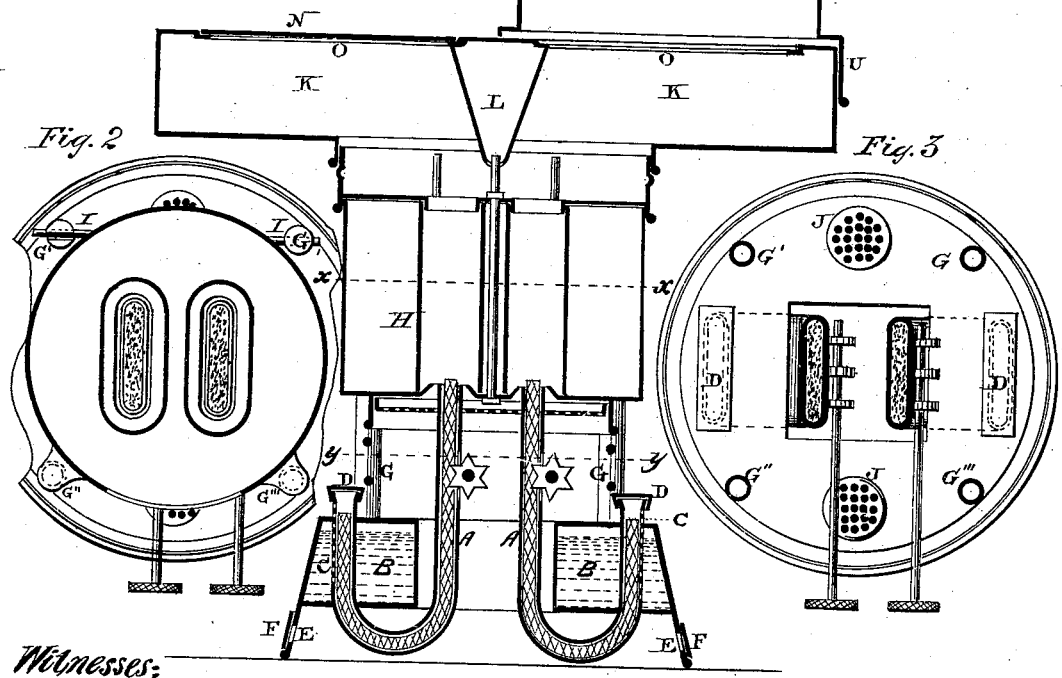
Figure 3:
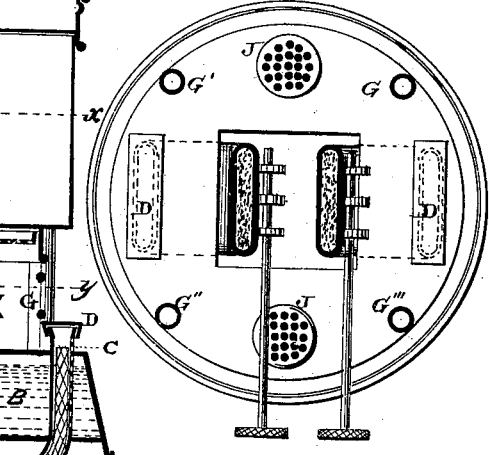
Figure 14:
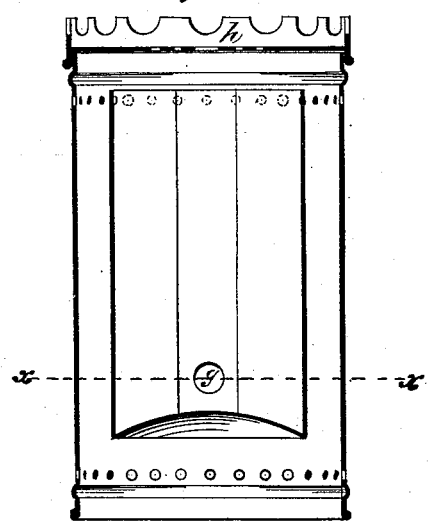
Figure 15:
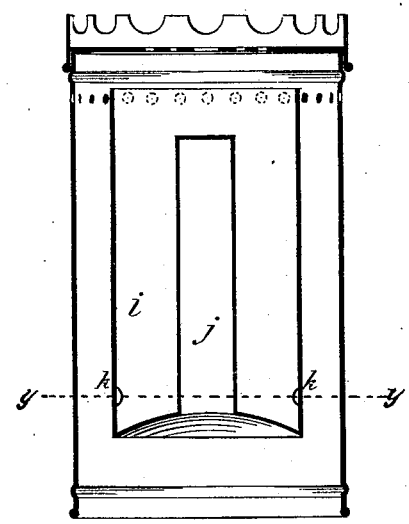
Figure 16:
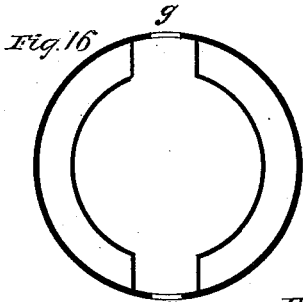
Figure 17:
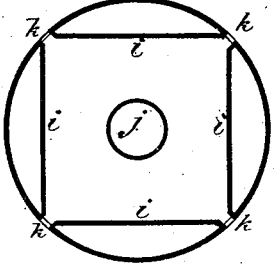
Figures 11, 13:
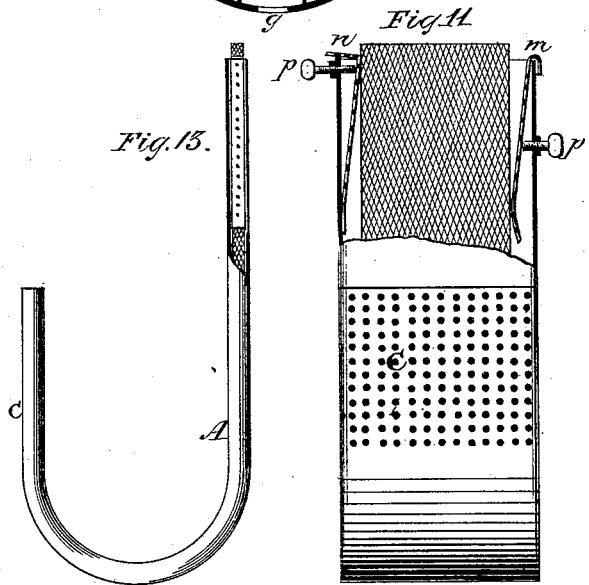
Figure 12:
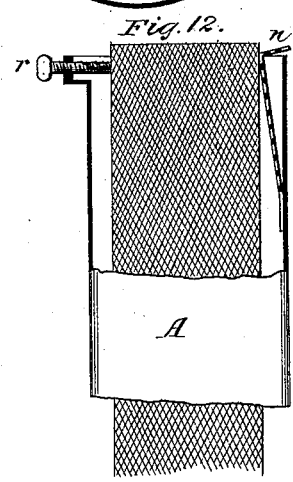

Figure 1 represents a sectional front elevation, showing my invention with oven attached. Fig. 2 is a cross-section through the line $x\,x$ in Fig. 1, showing the hinge-connection of the stove to the standards. Fig. 3 is a cross-section through the line $y\,y$ in Fig. 1. Fig. 4 is a plan of the oven-top, part being broken away to show the construction the more clearly. Fig. 5 is a sectional side view, showing my adjustable two-holed top with deflector in position. Fig. 6 is a sectional elevation of drum, shown attached to the stove. Fig. 7 is a cross-section through the line $x\,x$ in Fig. 6. Fig. 8 is a cross-section through the line $y\,y$ in Fig. 6. Fig. 9 is a plan of the two-holed top, showing the holes all closed. Fig. 10 is a plan of the same, showing its adaptation for a single vessel, which requires to be brought directly over the flame. Fig. 11 is a sectional front view, showing safety-springs for adjustment of wick in the wick-tube. Fig. 12 is a sectional front view of a modification of the same. Fig. 13 is a side view of the same. Figs. 14 and 15 represent modified forms of drums. Fig. 16 is a cross-section through the line $x\,x$ in drum shown in Fig. 14; and Fig. 17 is a cross-section through the line $y\,y$ of drum shown in Fig. 15.

Similar letters of reference indicate corresponding parts.

In the case here presented, the wick-tubes A A are made in the form of a siphon whose bend extends below the oil-reservoir B, and whose short leg extends up through the reservoir, as shown in Fig. 1. The said short leg of the siphon is perforated on its face, both inside and outside the reservoir, as shown at C, and its top protected by a sliding cover, D.

The object in thus perforating the face of the siphon-tube is to admit both oil and air to the wick; and the object in having the wick-tubes made in siphon form is to have as great a portion of its exterior surface exposed to the air as possible between the flame and point of contact with the under side of the oil-reservoir, thereby preventing the wick-tube from heating the reservoir. The cold air supplied for this purpose is admitted through perforations at the base, as shown at E, and the supply regulated as required by means of a sliding damper, F.

On top of the oil-chamber there are four rigid standards, G G' G'' G''', for the support of the stove H. The said standards are made hollow, and are perforated so as to allow air to circulate freely through them, that they may not become sufficiently warm to transmit heat of any consequence to the oil-chamber.

For convenience of attaching, detaching, or tilting the drums on the aforesaid legs or standards, I have two pins or trunnions, I I, projecting horizontally from the stove-bottom, the same being rigidly attached thereto, one of which being inserted sidewise in a hole made and provided for it near the upper end of the standard G, and the other pin or trunnion, bearing in a bayonet-slot in the standard G', enables the stove to be kept in position. The front of the stove has two lugs or feet extending from its bottom, which rest in or upon the tops of standards G″ G‴, thereby forming a firm and steady support for the cook or heating drums.

J J (see Figs. 3 and 5) represent two inverted detachable cones, perforated, and having an annular flanged rim, which fits neatly upon the necks on top of the oil-reservoir, so that the said reservoir may be advantageously filled without removing the cones, which serve not only to prevent foreign matter from entering the reservoir, but also as a vent for such gas or vapor as might collect; and, furthermore, effectually prevent such gases from communicating fire to the oil-chamber.

The two-holed top K is made so as to fit centrally over the stove H, as shown in Figs. 1 and 5, and the heat from the stove evenly divided by means of the wedge-shaped deflector L, which hangs by its flange resting on the upper surface of the two-holed top, as shown at $a$ $a$ in Figs. 5 and 9.

This two-holed top has two tapering recesses, M M, which allow the heat to circulate from one section to the other, either through or around the deflector L. The tops of the said recesses extend outward in semicircular form on each side of the two-holed top, as shown in Figs. 5, 9, and 10, thus forming two hot shelves or brackets on the same plane, and increasing its area.

The covers N N for the holes O O are made crescent-shaped, and the top of deflector in the form of a double crescent, as shown at P, so that by placing the two elliptical pieces Q Q over the aperture between the crescents the whole plane of the top may be covered, as shown in Fig. 9; and when it is desired to place a kettle or other vessel directly over the center of the stove, so that the heat from the burners may strike directly, I remove the deflector L and both the elliptical pieces Q Q, which leaves a central hole, R, as shown in Fig. 10.

S represents an extension-drum, upon which the oven is set, as shown in Fig. 1. The said extension has a semicircular flange, U, around its base, which encircles the exterior of one of the sections of the two-holed top, forming a good and sufficient hold thereon. The object of this extension-drum is to raise the oven a sufficient height above the plane of the two-holed top, so as not to interfere with its use for cooling purposes.

Heretofore great difficulty has been experienced in baking over oil-stoves on account of the heat passing off too rapidly. To obviate this difficulty I construct a double top to the oven, as shown in Figs. 1 and 4, and on the under side of the inner top-section I place a sliding perforated damper, so as to enable the heat to be retained as much as may be required. The said oven has a series of vent-holes, as shown at W W, through its top or sides, as may be deemed most desirable.

When the above-described stove is not required for cooking purposes I remove the two-holed top and oven, and in their stead, I place a drum or cylinder, X, on top of the stove, as shown in Fig. 6. This drum, being of the same diameter as the stove, is made of sufficient height to present a stove-like appearance, and acts in similar capacity to that of a chimney to a lamp. The interior construction of the said drum presents a large heating-surface, cold air entering through apertures Z to the drum X, and also through pipes Y Y Y to the inner cylinder $b$, whose base is concaved, so as to concentrate and conduct the heat to the pipe $c$, which extends into and through the cylinder-bottom, as shown in Figs. 6 and 8. The upper part of the said inner cylinder is made convex, so that it may radiate better and throw off its heat through the pipes $d$ $d$ $d$, which extend upward therefrom, through the breast or cone-shaped top $e$ into the room.

Any smoke or gaseous odors which might possibly be generated by reason of carelessness in trimming are carried off through the pipe $f$.

In Figs. 14 and 16 a modification of the drum is shown, in which air is admitted to the inner cylinder through apertures $g$ $g$. This cylinder has an open top, and the heat therefrom escapes through perforations in the top $h$, which is attached to or rests upon the top of the outer cylinder, as shown in the drawing.

In Figs. 15 and 17 another modification of the drum is shown. In this case I have a square-sided box, $i$, with open top and concaved bottom, having a single tube, $j$, with closed top, extending upward through its center, cold air being admitted at the four lower corners, as shown at $k$ $k$ $k$ $k$.

In order to allow for the expansion or contraction of the wick, and prevent fire from following the gas or vapor down the wick-tube, I have provided springs for one or both sides. One of the said springs, $m$, is attached to the top of tube, and has its lower extremity free. The other spring, $n$, has its lower extremity fixed and its upper end free. The upper end of this spring $n$ is bent at a right angle, so that it may fill the space at the top between the wick and its tube. For convenience in adjusting the springs I have provided set-screws $p$ $p$.

It will here be observed that the said springs may be made either plain or perforated, so as to allow such gas or vapor as may form to escape, and burn without danger of following down the wick-tubes.

I propose having a hollow head made in form of a bolt, the said head being made either plain or perforated, and of sufficient size to fill the space between the wick and tube. In this latter case only one spring is necessary, as shown in Fig. 12.

I am aware that springs have been used against the side of the wick, and that perforated diaphragms have been used in the supply-tubes; but these are not my invention.

Having thus described my invention, I claim as new and desire to secure by Letters Patent—

1. The siphon wick-tubes A A, having their bend below the oil-reservoir, one end of each of the said tubes extending upward through the oil-reservoir, said tubes having a perforated face, C, both inside and outside the reservoir, for the use and purpose substantially as herein shown and specified.

2. Siphon tubes, in combination with base apertures E and sliding dampers F, for regulating the supply of cold air to keep said siphon-tubes cool, substantially as described.

3. The inverted perforated detachable cones J, with flanged rims, as described, for convenience and safety in replenishing and supplying air to the oil-chamber and siphon-tubes, substantially as herein shown and described.

4. The perforated legs or standards G G' G" G''', the rear standards being one punctured and the other slotted on top for the reception of pins or trunnions I I, said pins or trunnions being rigidly attached to the base, forming a joint for tilting and holding the drums secure, substantially as herein shown and described.

5. A two-hole top whose plane is increased by two hollow shelves, M M, heated by direct air communication from the stove, both through and around the deflector L, substantially as herein shown and described.

6. The perforated double top of oven, with sliding damper V, as applied to an oil-stove, for retaining and regulating the heat therein, substantially as herein shown and described.

7. The extension-drum S, with flange U, as applied to a two-hole top for oil-stoves, for the use and purpose herein specified.

8. The drum or cylinder X, forming the top of stove for heating purposes, in combination with inner chamber $b$, inlet-pipes Y Y Y, pipe $c$, and outlet-pipes $d$ $d$ $d$, applied in the manner and for the purpose substantially as specified.

9. The springs $n$ $m$, either perforated or plain, with or without set-screws $p$, as applied to a siphon or other wick-tube, for the use and purpose specified.

10. A hollow head or bolt, $r$, arranged to screw up to the wick, and thus fill the space, substantially as herein shown and described.

AUGUSTUS F. KIBBE.

Witnesses:
A. BELL MALCOMSON, Jr.,
CHARLES H. NASH.